(12) United States Patent
Tanno et al.

(10) Patent No.: US 11,458,778 B2
(45) Date of Patent: Oct. 4, 2022

(54) PNEUMATIC TIRE AND METHOD OF MANUFACTURING PNEUMATIC TIRE

(71) Applicant: The Yokohama Rubber Co., LTD., Tokyo (JP)

(72) Inventors: Atsushi Tanno, Hiratsuka (JP); Jun Matsuda, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 415 days.

(21) Appl. No.: 16/004,266

(22) Filed: Jun. 8, 2018

(65) Prior Publication Data
US 2018/0290502 A1    Oct. 11, 2018

Related U.S. Application Data

(62) Division of application No. 14/380,059, filed as application No. PCT/JP2013/054204 on Feb. 20, 2013, now Pat. No. 10,017,014.

(30) Foreign Application Priority Data

Feb. 21, 2012  (JP) ................................. 2012-035451

(51) Int. Cl.
*B60C 13/00* (2006.01)
*B60C 1/00* (2006.01)
(Continued)

(52) U.S. Cl.
CPC ........ *B60C 13/002* (2013.01); *B29D 30/0662* (2013.01); *B29D 30/0678* (2013.01);
(Continued)

(58) Field of Classification Search
CPC . B60C 13/002; B60C 13/04; B60C 2013/045; B60C 13/001
See application file for complete search history.

(56) References Cited

U.S. PATENT DOCUMENTS 2,761,489 A * 9/1956 Kraft .................... B60C 13/001
156/116
4,096,899 A * 6/1978 Kitazawa .................. B60C 3/06
152/542
(Continued)

FOREIGN PATENT DOCUMENTS

DE         10004439     *  8/2001
EP           554108     *  8/1993
(Continued)

OTHER PUBLICATIONS

Tam, Garvin. Coefficients of Friction for Teflon. 2004. [retrieved on Aug. 16, 2020], Retrieved from the Internet <URL: https://hypertextbook.com/facts/2004/GarvinTam.shtml>. (Year: 2004).*
(Continued)

*Primary Examiner* — Robert C Dye
(74) *Attorney, Agent, or Firm* — Thorpe North & Western

(57) ABSTRACT

A pneumatic tire is provided with a carcass layer and a sidewall rubber disposed on an outer side in a tire width direction of the carcass layer. Additionally, the pneumatic tire is provided with a resin coating applied on a predetermined region of a sidewall portion. Additionally, a minimum value of a wall thickness t of a rubber of the sidewall portion in the region applied with the resin coating is in a range of $0.05 \text{ mm} \leq t \leq 4.0 \text{ mm}$. Additionally, a thickness of the resin coating is in a range of 20 μm or more and 300 μm or less.

15 Claims, 13 Drawing Sheets

(51) Int. Cl.
*B29D 30/72* (2006.01)
*B29D 30/06* (2006.01)
*B60C 13/02* (2006.01)
*B60C 13/04* (2006.01)

(52) U.S. Cl.
CPC ............ *B29D 30/72* (2013.01); *B60C 1/0025* (2013.01); *B60C 13/001* (2013.01); *B29D 2030/724* (2013.01); *B29D 2030/728* (2013.01); *B60C 13/02* (2013.01); *B60C 2013/045* (2013.01)

(56) References Cited

U.S. PATENT DOCUMENTS

| | | | | |
|---|---|---|---|---|
| 4,854,361 | A * | 8/1989 | Gasowski | B60C 15/0027 152/552 |
| 5,149,591 | A * | 9/1992 | Patitsas | C09D 129/04 428/423.1 |
| 5,315,764 | A * | 5/1994 | Robbins | B29D 30/72 152/524 |
| 5,645,661 | A * | 7/1997 | Clementz | B60C 13/02 152/523 |
| 2008/0118306 | A1* | 5/2008 | McCrary | G08G 1/01 404/7 |
| 2009/0250150 | A1* | 10/2009 | Negroni | C09D 127/06 152/450 |
| 2010/0224299 | A1* | 9/2010 | Miyazaki | B60C 1/0025 152/525 |
| 2011/0011511 | A1 | 1/2011 | Miyazaki et al. | |
| 2011/0094649 | A1* | 4/2011 | Miyazaki | C08L 9/00 152/525 |
| 2014/0332135 | A1* | 11/2014 | Himuro | B60C 13/001 152/524 |

FOREIGN PATENT DOCUMENTS

| | | | |
|---|---|---|---|
| EP | 2 258 770 | | 12/2010 |
| GB | 2034603 | * | 6/1980 |
| JP | H01-240307 | * | 9/1989 |
| JP | 2009-255881 | | 11/2009 |
| WO | WO 2009/119232 | | 10/2009 |

OTHER PUBLICATIONS

English machine translation of DE 10004439. (Year: 2001).*
"Friction Coefficient Measurement." Retrieved from the Internet: <URL: https://www.tic-test.co.jp/service/friction/>. Retrieved on Feb. 23, 2022. (Year: 2022).*

* cited by examiner

| | Conventional Example | Comparative Example 1 | Working Example 1 | Working Example 2 | Comparative Example 2 |
|---|---|---|---|---|---|
| Resin coating thickness (μm) | None | 10 | 20 | 300 | 400 |
| Sidewall rubber thickness t (mm) | 5.0 | 0.03 | 0.1 | 3.0 | 5.0 |
| Rolling resistance | 100 | 91 | 92 | 97 | 104 |
| Cutting resistance | 100 | 85 | 101 | 116 | 132 |

PNEUMATIC TIRE AND METHOD OF MANUFACTURING PNEUMATIC TIRE

RELATED APPLICATIONS

This application is a divisional of U.S. application Ser. No. 14/380,059 filed on Aug. 20, 2014, which is the national stage of International Patent Application No. PCT/JP2013/054204 filed on Feb. 20, 2013, which claims priority to Japan Patent Application No. 2012-035451, filed on Feb. 21, 2012.

TECHNICAL FIELD

The present technology relates to a pneumatic tire and a method of manufacturing the pneumatic tire, and more particularly relates to a pneumatic tire that can reduce a rolling resistance of a tire and improve a cutting resistance of the tire and a method of manufacturing the pneumatic tire.

BACKGROUND

With pneumatic tires of recent years, there is a demand to reduce a rolling resistance of a tire for fuel economy improvement. Additionally, there is a demand to improve a cutting resistance with respect to contact with a curb or the like. Generally, when a rubber thickness of a sidewall portion is reduced, while the rolling resistance of the tire decreases, the cutting resistance of the tire worsens. Because of this, these two effects are in a mutually exclusive relationship.

Japanese Unexamined Patent Application Publication No. 2009-538768 provides an example conventional pneumatic tire.

SUMMARY

The present technology provides a pneumatic tire that can reduce a rolling resistance of a tire and improve a cutting resistance of the tire. The present technology also provides a method of manufacturing the pneumatic tire.

A pneumatic tire according to the present technology is a pneumatic tire provided with a carcass layer and a sidewall rubber disposed on an outer side in a tire width direction of the carcass layer, the pneumatic tire comprises a resin coating applied on a predetermined region A of a sidewall portion, wherein a minimum value of a wall thickness t of the sidewall portion in the region A applied with the resin coating is in a range of 0.05 mm≤t≤4.0 mm.

Additionally, a method of manufacturing the pneumatic tire according to the present technology is a method of manufacturing the pneumatic tire described above provided with the steps of vulcanization molding a green tire and applying the resin coating on a tire using a residual heat after the vulcanization molding.

Additionally, a method of manufacturing the pneumatic tire according to the present technology is a method of manufacturing the pneumatic tire described above provided with the steps of filling the green tire in a tire vulcanizing mold for vulcanization molding, and applying the resin coating on a tire in the tire vulcanizing mold by injecting a coating material in the tire vulcanizing mold.

With the pneumatic tire and the methods of manufacturing the pneumatic tire according to the present technology, because the wall thickness t of the sidewall portion is made appropriate in the range described above, there are advantages that a rolling resistance of the tire can be reduced and a cutting resistance of the tire is improved.

DETAILED DESCRIPTION

The present technology is described below in detail with reference to the accompanying drawings. However, the present technology is not limited to these embodiments. Moreover, constituents which can possibly or obviously be substituted while maintaining consistency with the present technology are included in constitutions of the embodiments. Furthermore, the multiple modified examples described in the embodiment can be combined as desired within the scope apparent to a person skilled in the art.

Pneumatic Tire

Figure 1:
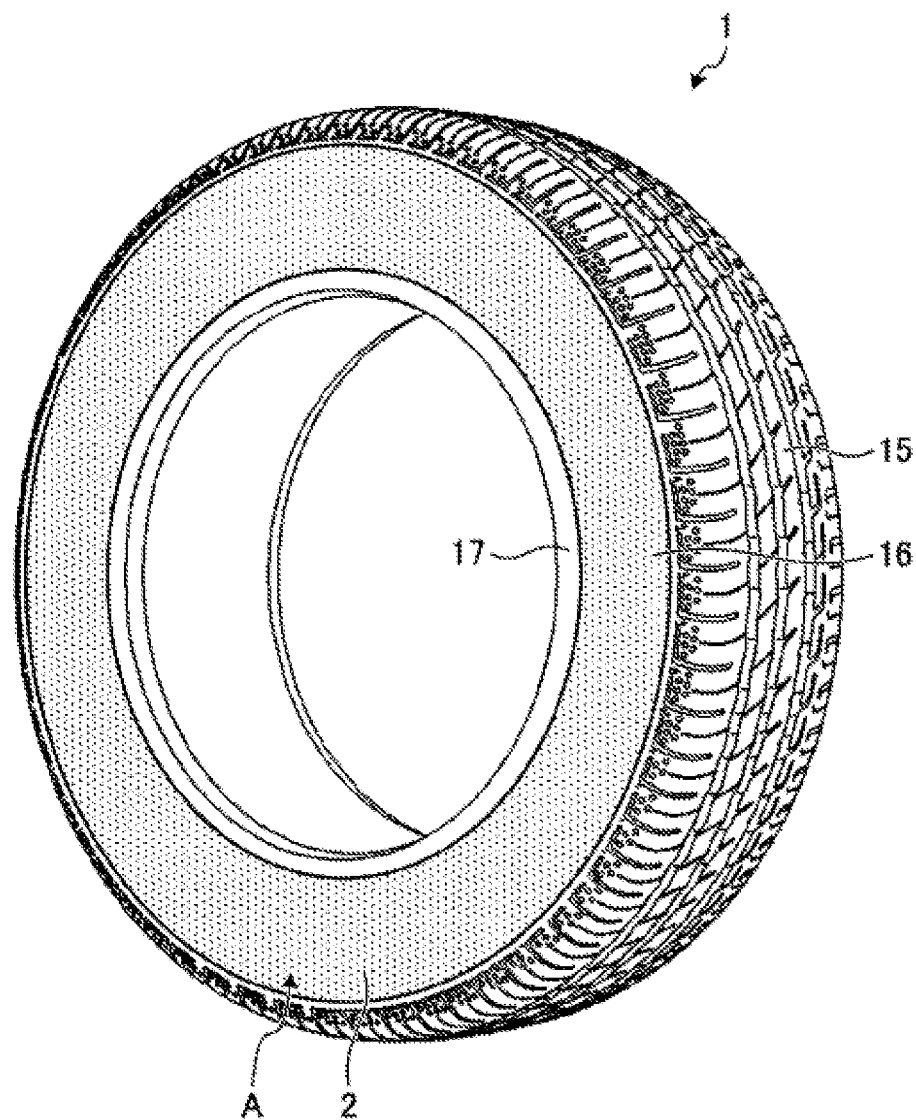
FIG. 1 is a perspective view illustrating a pneumatic tire according to an embodiment of the present technology.
Figure 2:
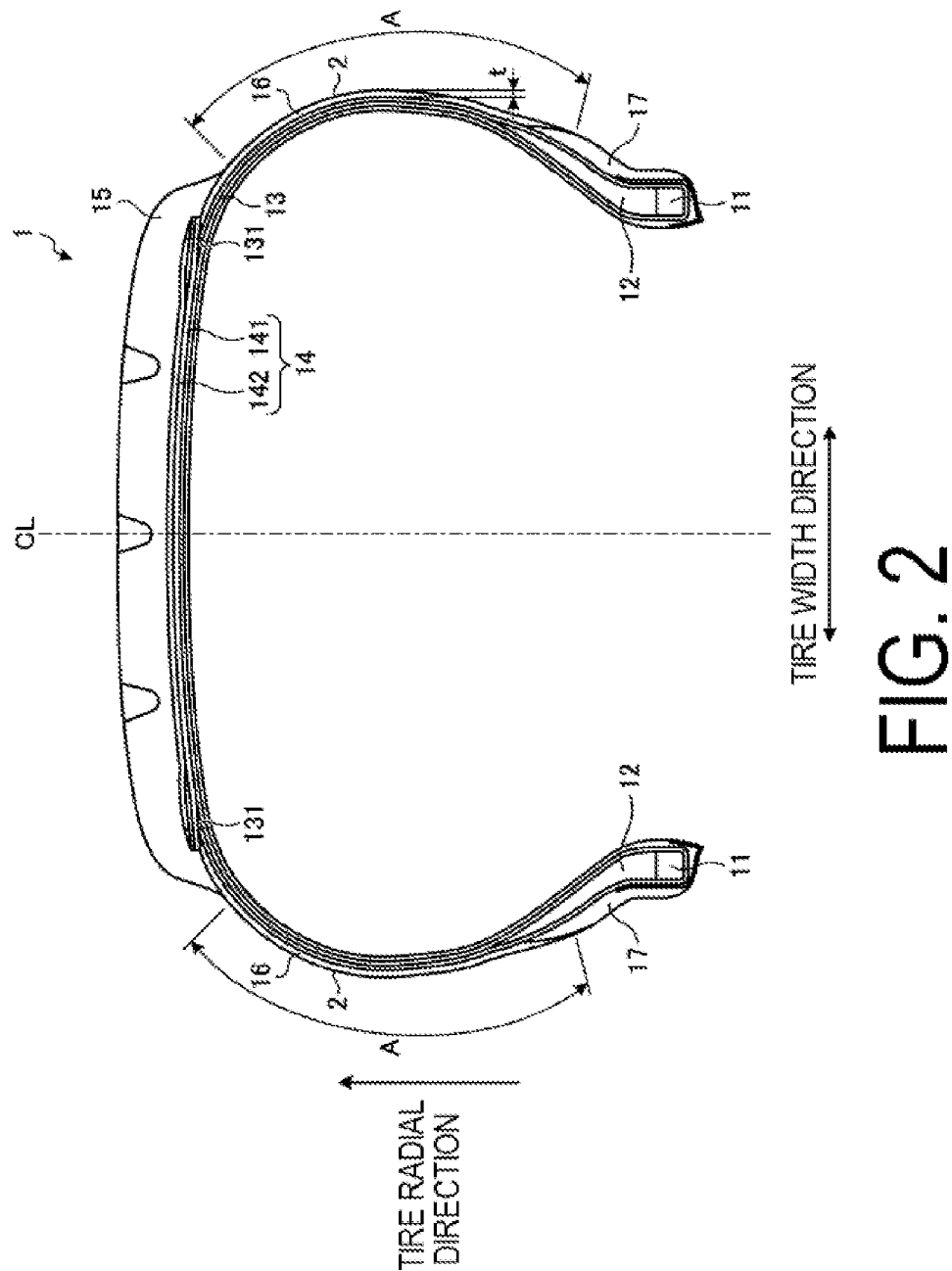
FIG. 2 is a cross sectional view in a tire meridian direction of the pneumatic tire depicted in FIG. 1.

FIG. 1 is a perspective view of a pneumatic tire 1 according to an embodiment of the present technology. FIG. 2 is a cross sectional view in a tire meridian direction of the pneumatic tire 1 depicted in FIG. 1. These drawings illustrate a passenger car tire as an example of the pneumatic tire 1. Note that the symbol CL refers to a tire equator plane.

A pneumatic tire 1 includes a pair of bead cores 11, 11, a pair of bead fillers 12, 12, a carcass layer 13, a belt layer 14, tread rubber 15, a pair of side wall rubbers 16, 16, and a pair of bead rubbers 17, 17 (see FIG. 1). This pneumatic tire 1 can be applied as both a radial tire and a bias tire.

The pair of bead cores 11, 11 have annular structures and constitute cores of left and right bead portions. The pair of bead fillers 12, 12 are disposed on a periphery of each of the pair of bead cores 11, 11 in the tire radial direction so as to reinforce the bead portions.

The carcass layer 13 stretches between the left and right side bead cores 11 and 11 in toroidal form, forming a framework for the tire. Additionally, both ends of the carcass layer 13 are folded toward an outer side in the tire width direction so as to envelop the bead cores 11 and the bead fillers 12, and fixed. Additionally, the carcass layer 13 is constituted by a plurality of carcass cords formed from steel or organic fibers (for example, aramid, nylon, polyester, rayon, or the like), covered by coating rubber, and subjected to a rolling process. Note that the carcass layer 13 may have a single layer structure formed from a single carcass ply or may have a multilayer structure formed from a plurality of carcass plies.

The belt layer 14 is formed by stacking a pair of cross belts 141, 142, and disposing the belts to extend over an outer circumference of the carcass layer 13. The pair of cross belts 141, 142 are constituted by a plurality of belt cords formed from steel or organic fibers, covered by coating rubber, and subjected to a rolling process, having a belt angle, as an absolute value, of not less than 10° and not more than 30°. Further, each of the belts of the pair of cross belts 141, 142 has a belt angle (inclination angle in the fiber direction of the belt cord with respect to the tire circumferential direction) denoted with a mutually different symbol, and the belts are stacked so as to intersect each other in the belt cord fiber directions (crossply configuration).

The tread rubber 15 is disposed on an outer circumference in the tire radial direction of the carcass layer 13 and the belt layer 14, and forms a tread portion of the tire. The pair of side wall rubbers 16, 16 are disposed on each outer side of the carcass layer 13 in the tire width direction, so as to form left and right sidewall portions of the tire. A pair of bead rubbers 17, 17 are disposed on each outer side of the left and right bead cores 11, 11 and the bead fillers 12, 12 in the tire width direction so as to form left and right bead portions of the tire.

Resin Coating of Sidewall Portion

Additionally, this pneumatic tire 1 is provided with a resin coating (resin film) 2 on the sidewall portion (see FIGS. 1 and 2).

This resin coating 2 is applied on a predetermined region A that includes an outer side top surface of a sidewall rubber 16. For example, with configurations of FIGS. 1 and 2, the resin coating 2 is applied from a buttress portion to a vicinity of a bead portion. Because of this, the resin coating 2 is applied across a portion of an outer side top surface of the tread rubber 15 and an entirety of the outer side top surface of the sidewall rubber 16. However, the resin coating 2 is not applied on a patterned portion of the tread portion or on a rim fitting portion of the bead portion. By this, a top surface friction coefficient is ensured in the patterned portion of the tread portion and in the rim fitting portion. Note that the buttress portion refers to a connecting portion between a profile of the tread portion and a profile of the sidewall portion.

Additionally, the resin coating 2 is formed from a resin material that has, for example, a urethane resin, a silicon resin, a fluororesin, an acrylic resin, a melamine resin, or the like as a main component. Additionally, the resin coating 2 is preferably formed from a resin material that includes, for example, an ultraviolet absorber, a light stabilizer, or the like. Additionally, the resin coating 2 is formed by coating a water-based coating composition formed from the resin material described above on a top surface of the sidewall portion. Additionally, a thickness of the resin coating 2 is preferably in a range of 20 μm or more and 300 μm or less, and more preferably in a range of 30 μm or more and 200 μm or less.

Additionally, a dynamic friction coefficient of the region A applied with the resin coating 2 is preferably set as 0.5 or less, more preferably as 0.4 or less, and still more preferably as 0.3 or less. The dynamic friction coefficient of the region A can be realized by generating the resin coating 2 by adding a silicon oil, molybdenum disulfide, carbon graphite, the fluororesin, or the like, for example, to the resin material described above. Note that the dynamic friction coefficient is measured for a flat portion top surface of the region A applied with the resin coating 2 by a test method prescribed by JIS-K7125.

Additionally, the resin coating 2 is constituted from a stacked plurality of coating layers (not illustrated). For example, it is preferable that the resin coating 2 has a three-layer structure and is formed from a lowermost layer formed from a coating composition having a high adhesion (top surface modification property) with respect to the sidewall rubber 16, an intermediate layer formed from a urethane resin coating composition having a high strength, and a top surface layer formed from a silicon resin coating composition having a high luster (appearance quality). Additionally, at this time, it is preferable that a coating layer on an outermost layer and a coating layer on a lower layer thereof are formed from coating compositions having mutually differing colors.

Additionally, the thickness of the resin coating 2 at a splice portion (in particular, an overlap portion of an end in the tire circumferential direction of the carcass ply) of the carcass layer 13 is preferably thinner than the thickness of the resin coating 2 at another portion of the region A. When inflating the tire, a phenomenon occurs where the top surface of the sidewall portion caves in at the splice portion of the carcass layer 13. This is due to a rigidity of the splice portion of the carcass layer 13 being higher than its surroundings. Therefore, by making the thickness of the resin coating 2 at this position thinner than its surroundings, a rigidity difference between the splice portion of the carcass layer 13 and its surroundings can be eliminated (mitigated).

Note that in a configuration of FIG. 2, the resin coating 2 is formed respectively on the left and right sidewall portions. However, the resin coating 2 is not limited thereto and may be applied only on one sidewall portion (not illustrated). For example, when the pneumatic tire 1 has a specification of a mounting direction relative to a vehicle, the resin coating 2 may be applied only on a sidewall portion that is an outer side in a car width direction in a vehicle mounted state. Note that the specification of the mounting direction can be displayed by, for example, a mark or unevenness attached to the sidewall portion of the tire.

Additionally, a minimum value of a wall thickness t of a rubber of the sidewall portion in the region A applied with the resin coating 2 is in a range of $0.05 \text{ mm} \le t \le 4.0 \text{ mm}$ (see FIG. 2). Additionally, the wall thickness t of the rubber of the sidewall portion in an entirety of the region A applied with the resin coating 2 is preferably in the range of $0.05 \text{ mm} \le t \le 4.0 \text{ mm}$. Additionally, the wall thickness t of the rubber of the sidewall portion is more preferably in a range of $0.1 \text{ mm} \le t \le 3.0 \text{ mm}$. The wall thickness t of the rubber of the sidewall portion is measured as a wall thickness of a rubber material between the carcass layer 13 and the resin coating 2. Additionally, the rubber of the sidewall portion is mainly formed from the sidewall rubber 16 but can include portions of the tread rubber 15 and the bead rubber 17, an additionally disposed rubber member, and the like.

For example, in the configuration of FIG. 2, the sidewall rubber 16 has a thin structure, and a wall thickness of an entirety of the sidewall rubber 16 is in a range of 0.05 mm or more and 4.0 mm or less. Because of this, the wall thickness t of the rubber of the sidewall portion in a region from an overlap portion between the sidewall rubber 16 and the tread rubber 15 to an overlap portion between the sidewall rubber 16 and the bead rubber 17 matches the wall thickness of the sidewall rubber 16. Additionally, the resin coating 2 is applied on substantially an entirety of a portion where the sidewall rubber 16 is exposed on a tire top surface.

With this pneumatic tire 1, a rubber amount of the sidewall portion is reduced and a rolling resistance of the tire is reduced by the wall thickness t of the rubber of the sidewall portion in the region A applied with the resin coating 2 being in the range described above. Meanwhile, a cutting resistance of the sidewall portion is properly ensured by the resin coating 2 being applied on the sidewall portion. That is, the cutting resistance of the sidewall portion decreases when the wall thickness t of the rubber of the sidewall portion is made thin, but the cutting resistance of the sidewall portion is properly ensured by the resin coating 2 being applied on the sidewall portion.

Note that with this pneumatic tire 1, a breaking elongation of the sidewall rubber 16 is preferably in a range of 200% or more and 500% or less. Note that the breaking elongation is measured in compliance with JIS-K7161 for a test piece of the 1B type (a dumbbell type of a thickness of 3 mm) prescribed by JIS-K7162.

Additionally, an additive amount of an antioxidant to the sidewall rubber 16 is preferably in a range of 0.1 parts by weight or more and 2.0 parts by weight or less, and more preferably in a range of 0.2 parts by weight or more and 1.0 parts by weight or less. As the antioxidant, SANTOFLEX 6PPD made by FlexSys Inc., for example, can be used.

Additionally, as described above, the carcass layer 13 is disposed by folding left and right ends 131, 131 toward the outer side in the tire width direction. At this time, the ends 131, 131 of the carcass layer 13 are preferably disposed in positions away from the region A applied with the resin coating 2. Specifically, in the cross sectional view in the tire meridian direction, when a perpendicular line relative to the carcass layer 13 is drawn with the end 131 of the carcass layer 13 as a starting point, this perpendicular line and the region A applied with the resin coating 2 must not intersect. The end 131 of the carcass layer 13 being in the region A applied with the resin coating 2 is not preferable because a difference in levels occurs in the sidewall portion and a function of the resin coating 2 decreases.

Additionally, the carcass layer 13 is formed from the steel or the organic fibers as described above, but is preferably formed from aramid fibers in particular. Additionally, it is preferable that the carcass layer 13 is provided with a multilayer structure formed by stacking the plurality of carcass plies (not illustrated), has an outer side carcass ply on the outermost layer formed from the aramid fibers that excel in cutting resistance, and has an inner side carcass ply on the lower layer thereof formed from nylon fibers or rayon fibers that excel in impact resistance.

Note that when the pneumatic tire 1 is provided with a tire notation (not illustrated) on the region A applied with the resin coating 2, this tire notation is preferably attached by printing. By this, compared to a configuration where the tire notation is formed from the unevenness, the region A applied with the resin coating 2 can be made flat. Note that the tire notation refers to display information such as a brand, a mark, or letters, for example.

Method of Manufacturing Pneumatic Tire

With a process of manufacturing this pneumatic tire 1 (not illustrated), each member such as a bead wire that constitutes the bead core 11; the carcass ply that constitutes the carcass layer 13; the belt plies 141, 142 that constitute the belt layer 14; the tread rubber 15; the sidewall rubber 16; and the bead rubber 17 is put in a molding machine to mold a green tire. Next, this green tire is filled in a tire vulcanizing mold. Next, this vulcanizing mold is heated, and the green tire is expanded outward in a radial direction by a pressure device so as to abut a tire molding die (tread surface molding portion) of the tire vulcanizing mold. Next, by heating the green tire, vulcanization is performed by bonding rubber molecules and sulfur molecules of the tread portion. At this time, a shape of the tire molding die is transferred to a tread surface of the green tire, and a tread pattern of the pneumatic tire 1 is molded. Then, the molded tire is pulled out from the tire vulcanizing mold.

Here, the resin coating 2 is applied on the tire pulled out from the tire vulcanizing mold using a residual heat after vulcanization molding. By this, the resin coating 2 can be dried quickly.

However, applying the resin coating 2 is not limited thereto, and the resin coating 2 (at least a coating material of the lowermost layer) may be applied on the tire in the tire vulcanizing mold by injecting a coating material in the tire vulcanizing mold. In this manner, by performing a pretreatment of the resin coating 2 in a tire vulcanization process, a cycle time of manufacturing can be shortened. Note that injection of the coating material in the tire vulcanizing mold can be realized by weakening an expansion pressure on the tire by the pressure device described above and creating a gap between the tire and the tire vulcanizing mold.

Modified Examples

FIGS. 3 to 11 are explanatory views illustrating modified examples of the pneumatic tire 1 depicted in FIG. 1. In these drawings, components that are the same as those of the pneumatic tire 1 described in FIGS. 1 and 2 will be assigned the same reference numerals, and description thereof will be omitted.

With the configuration of FIG. 2, the folded end 131 of the carcass layer 13 extends to an edge portion of the belt layer 14. Additionally, the resin coating 2 is applied across the portion of the outer side top surface of the tread rubber 15 and the entirety of the outer side top surface of the sidewall rubber 16. At this time, the resin coating 2 is applied only on the folded end 131 of the carcass layer 13.

Figure 3:
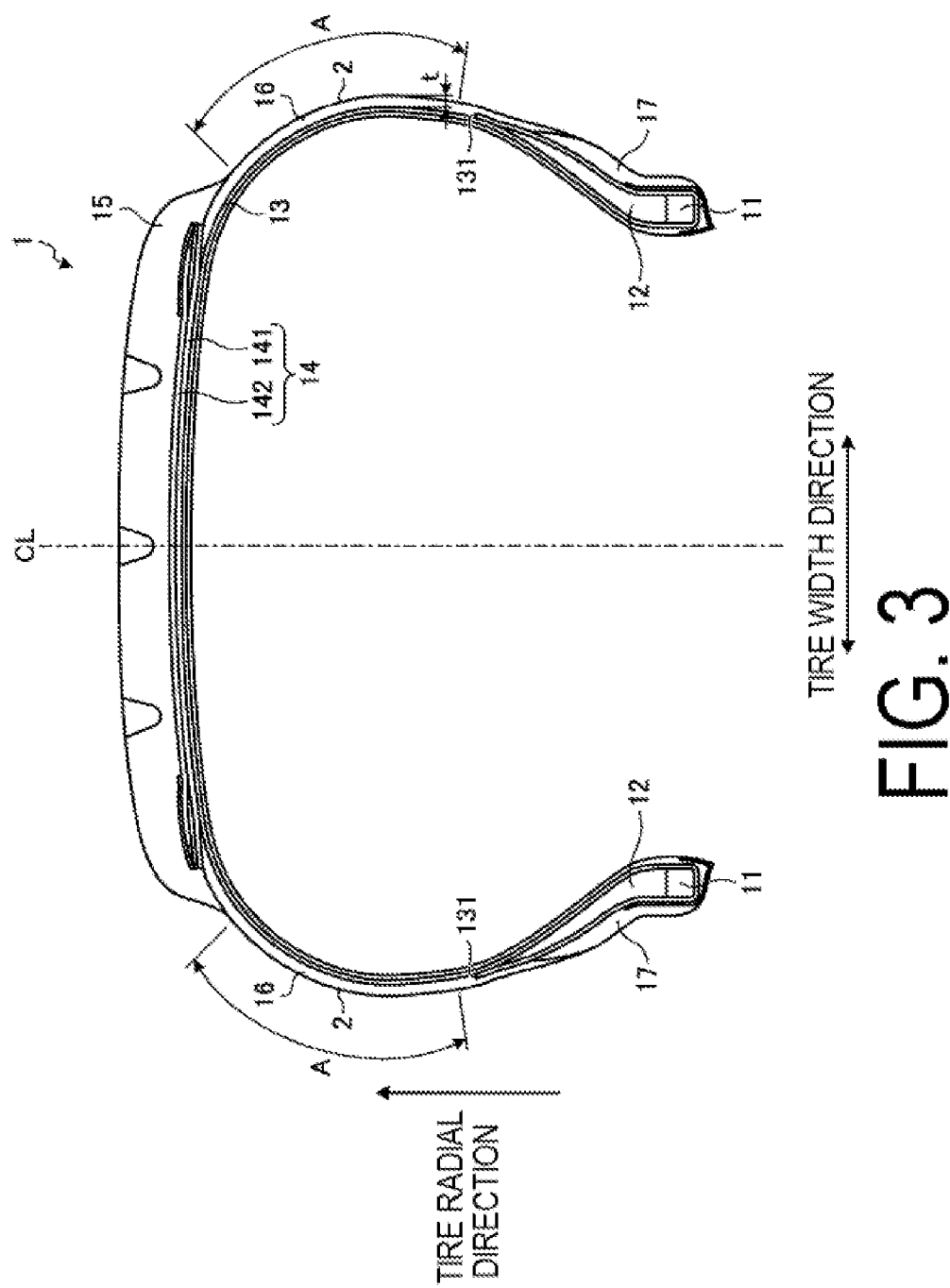
FIG. 3 is an explanatory view illustrating a modified example of the pneumatic tire depicted in FIG. 1.

However, the folded end 131 of the carcass layer 13 is not limited thereto and may be disposed in the middle of the sidewall portion, as illustrated in FIG. 3. At this time, the end 131 of the carcass layer 13 is preferably disposed in the position away from the region A applied with the resin coating 2. For example, with a configuration of FIG. 3, the resin coating 2 is applied from a position on an outer side in the tire radial direction of the folded end 131 of the carcass layer 13 to the buttress portion. By this, in the region A applied with the resin coating 2, an influence of the difference in levels due to the end 131 of the carcass layer 13 is reduced.

Additionally, with the configurations of FIGS. 1 and 2, the resin coating 2 (the region A applied with the resin coating 2) is formed continuously across substantially an entirety of the sidewall rubber 16.

However, the configurations of FIGS. 1 and 2 are not limited thereto, and the resin coating 2 may be applied on a plurality of regions A divided in the tire circumferential direction or the tire radial direction (see FIGS. 4 to 8).

Figure 4:
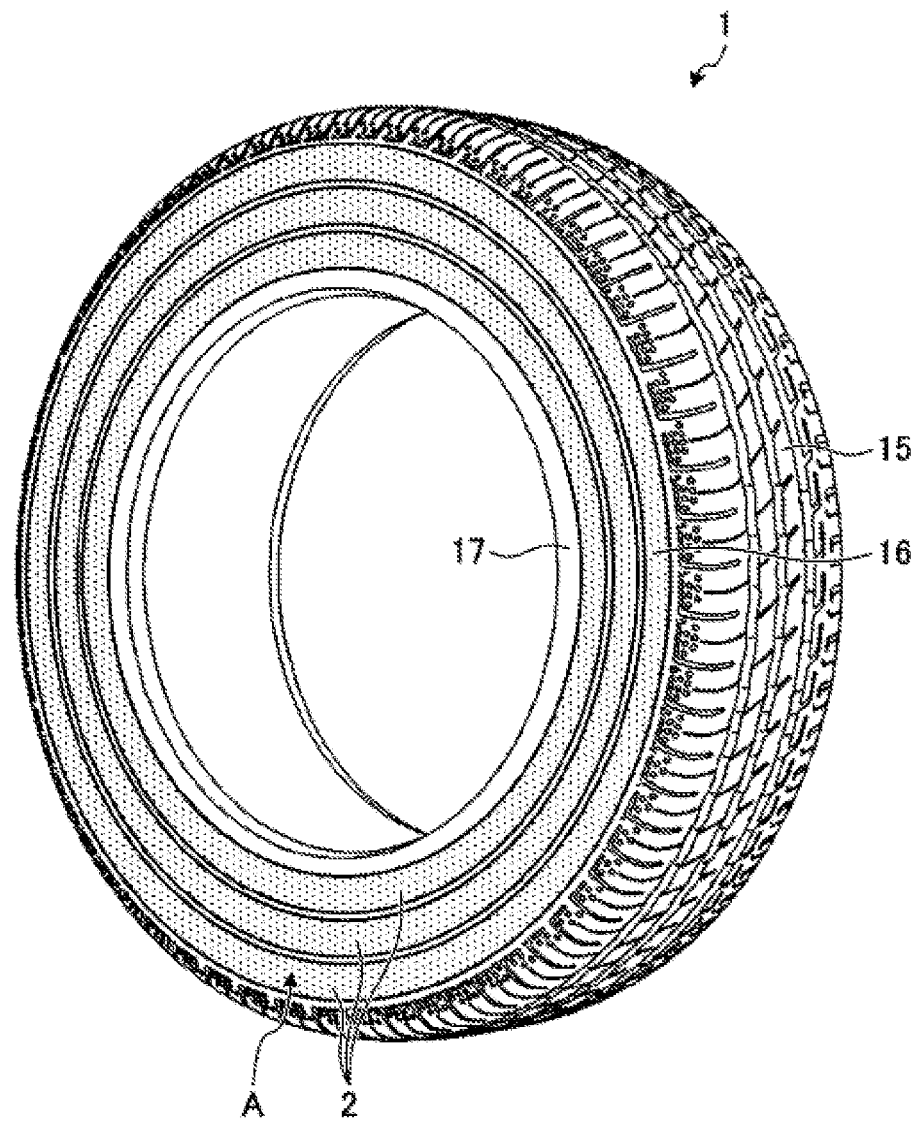
FIG. 4 is an explanatory view illustrating a modified example of the pneumatic tire depicted in FIG. 1.
Figure 5:
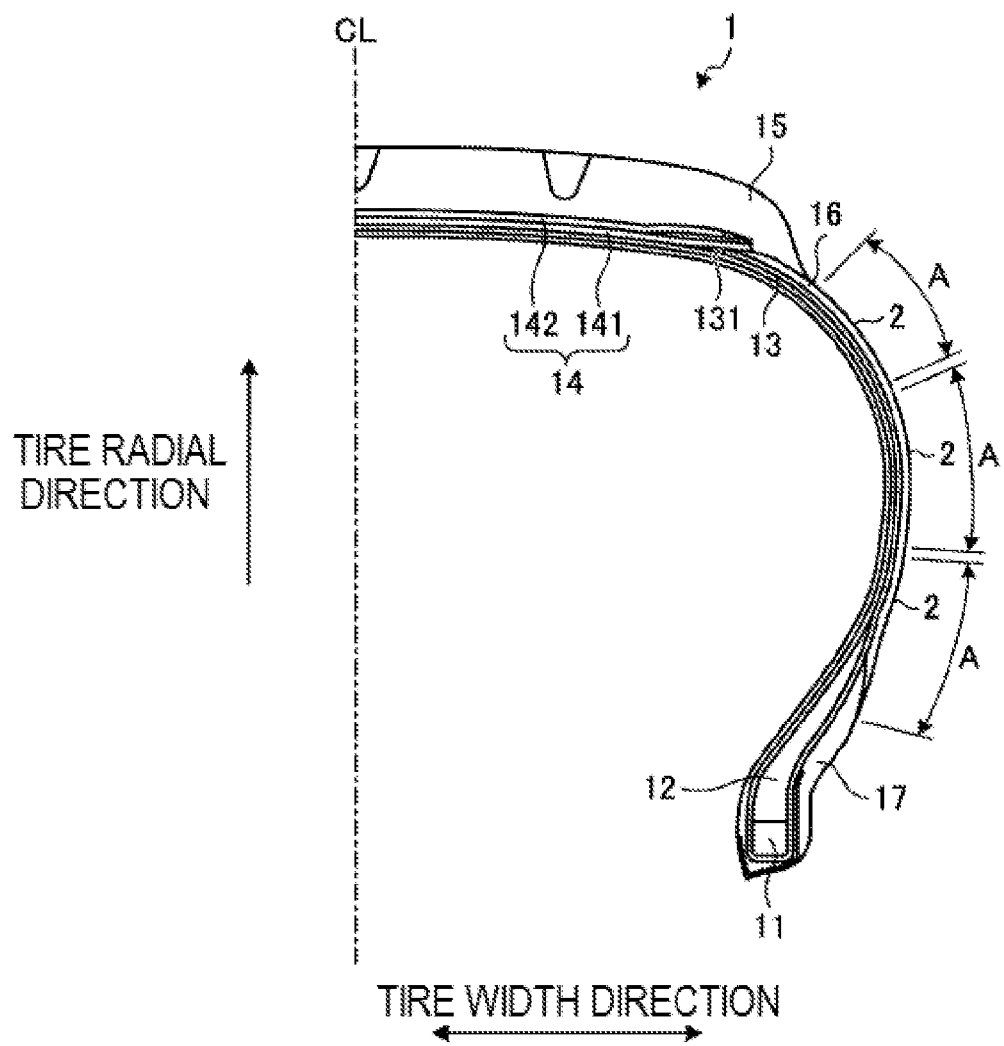
FIG. 5 is an explanatory view illustrating a modified example of the pneumatic tire depicted in FIG. 1.

For example, with configurations of FIGS. 4 and 5, the resin coating 2 is applied on the region A of a ring shape that extends continuously in the tire circumferential direction, and three rows of regions A are disposed at predetermined intervals in the tire radial direction. In this manner, a tensile stress acting on the resin coating 2 is mitigated by the resin coating 2 being applied on the plurality of regions A divided in the tire radial direction.

Additionally, with the configurations of FIGS. 4 and 5, the thicknesses of the resin coating 2 in each of the regions A divided in the tire radial direction preferably differ from each other. For example, the thickness of the resin coating 2 of the region A in the buttress portion is preferably thinner than the thickness of the resin coating 2 of another region. Because the buttress portion is a location where distortion is most likely to occur during tire rotation, by adopting the configuration described above, the tensile stress acting on the resin coating 2 of the buttress portion is effectively mitigated.

Figure 6:
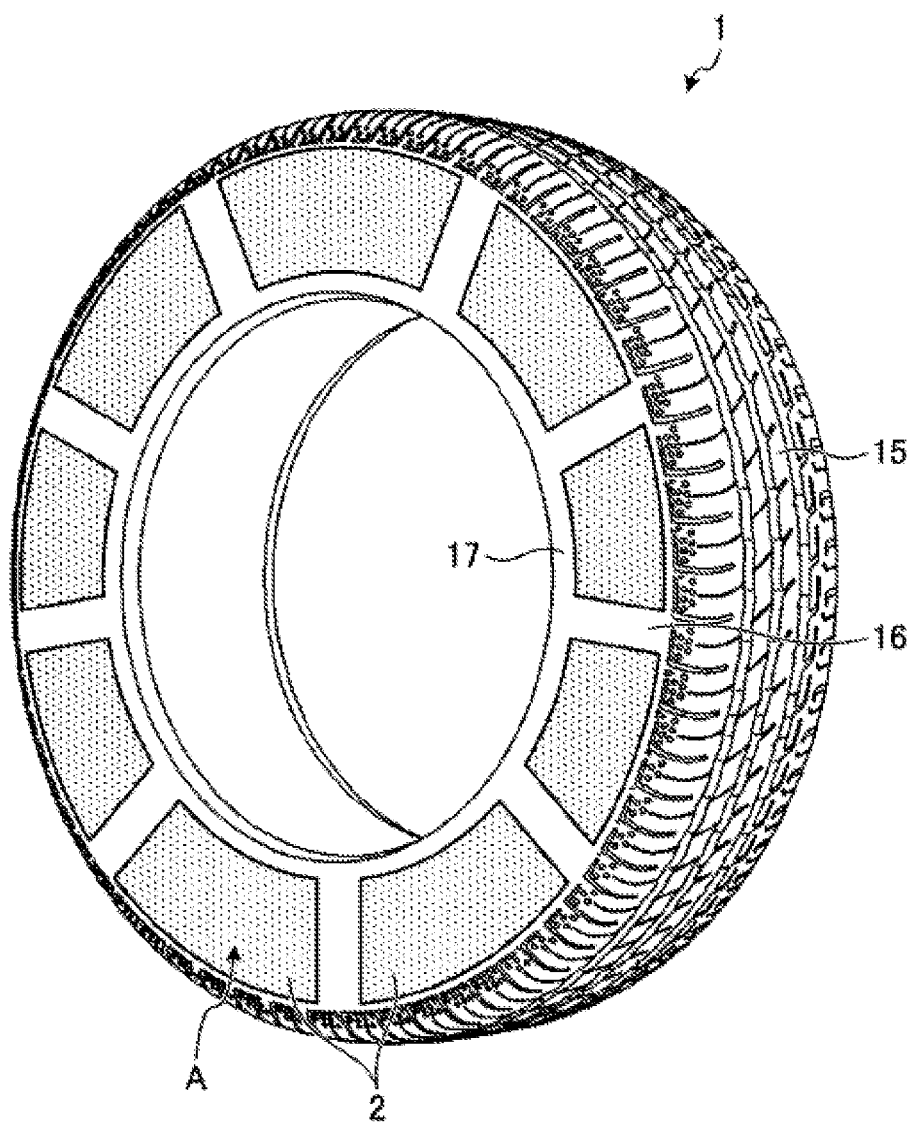
FIG. 6 is an explanatory view illustrating a modified example of the pneumatic tire depicted in FIG. 1.
Figure 7:
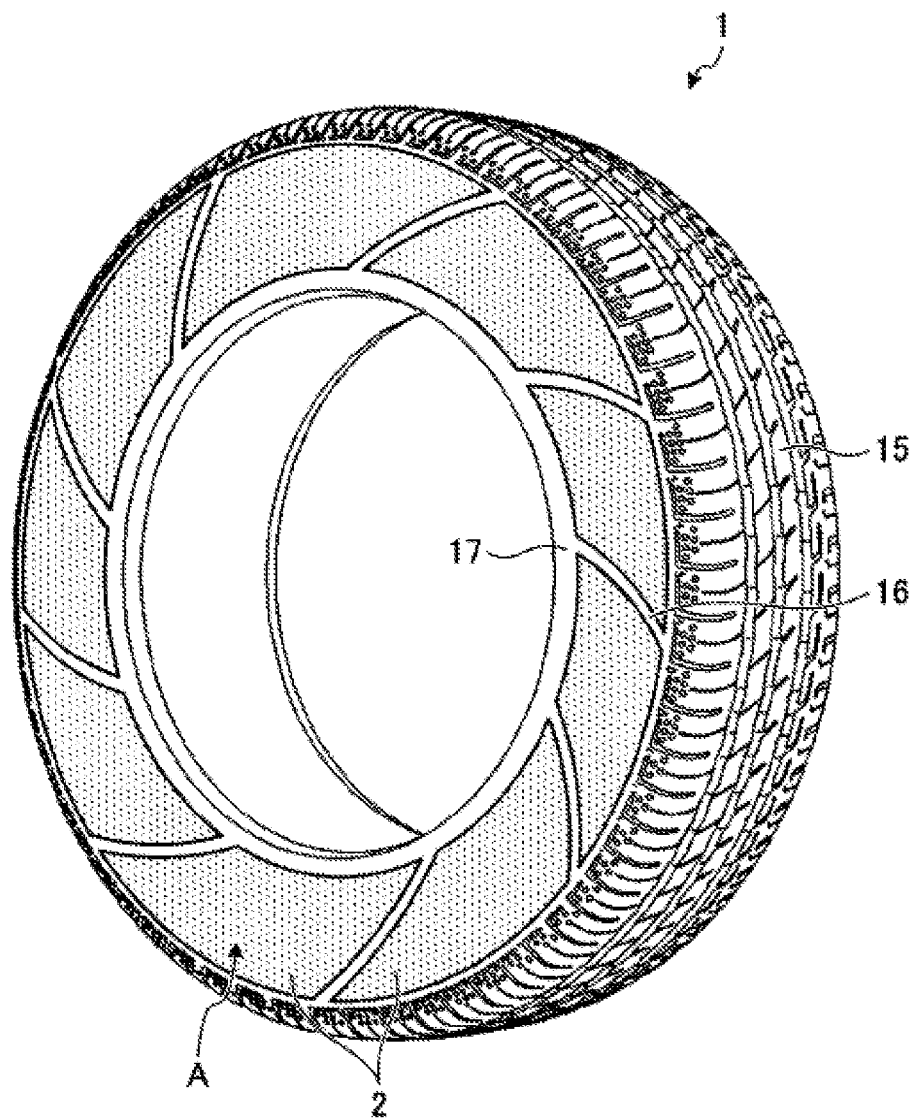
FIG. 7 is an explanatory view illustrating a modified example of the pneumatic tire depicted in FIG. 1.

Additionally, with configurations of FIGS. 6 and 7, the resin coating 2 is applied on the plurality of regions A disposed in a radial shape in the tire radial direction. Because of this, the resin coating 2 is applied on the plurality of regions A divided in the tire circumferential direction. In particular, with the configuration of FIG. 7, each of the regions A is disposed in an impeller shape by being tilted in the tire circumferential direction. In this manner, the tensile stress acting on the resin coating 2 is mitigated by the resin coating 2 being applied on the plurality of regions A divided in the tire circumferential direction.

Figure 8:
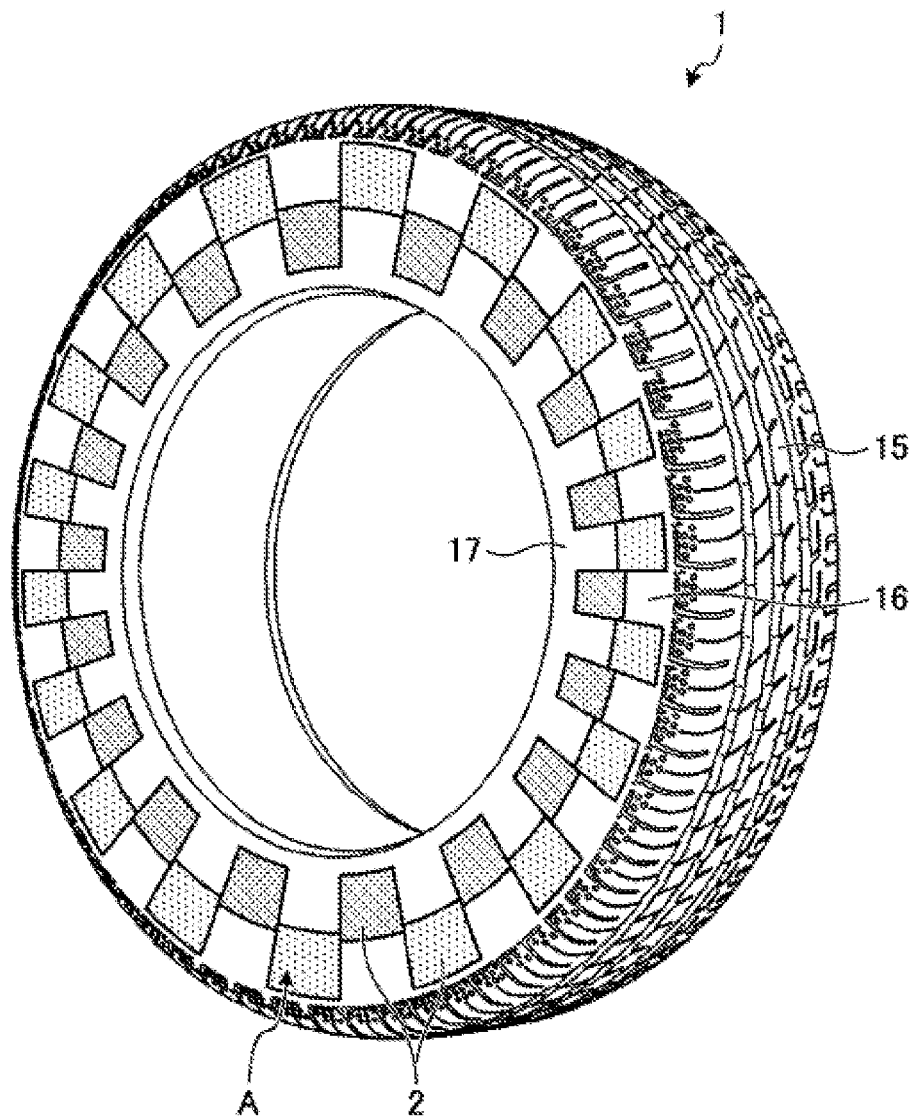
FIG. 8 is an explanatory view illustrating a modified example of the pneumatic tire depicted in FIG. 1.

Additionally, with a configuration of FIG. 8, the region A applied with the resin coating 2 and another region not applied with the resin coating 2 are arranged in patch shapes. Specifically, the region A applied with the resin coating 2 has a rectangular shape, and the plurality of regions A is arranged in a zigzag pattern toward the tire circumferential direction. By this, the tensile stress acting on the resin coating 2 is effectively mitigated. Additionally, the thickness of the resin coating 2 on the region A on a buttress portion side is set to be thinner than the thickness of the resin coating 2 on the region A on a bead portion side. By this, the tensile stress acting on the resin coating 2 of the buttress portion is effectively mitigated.

Note that with the configuration of FIG. 8, the region A applied with the resin coating 2 has the rectangular shape, but each of the regions A can have any shape. Additionally, each of the regions A may have mutually differing colors. By this, the appearance quality of the tire is improved.

Additionally, with the configuration of FIG. 3, the resin coating 2 is formed on a flat portion of the sidewall rubber 16. In other words, the region A applied with the resin coating 2 has a flat top surface shape.

Figure 9:
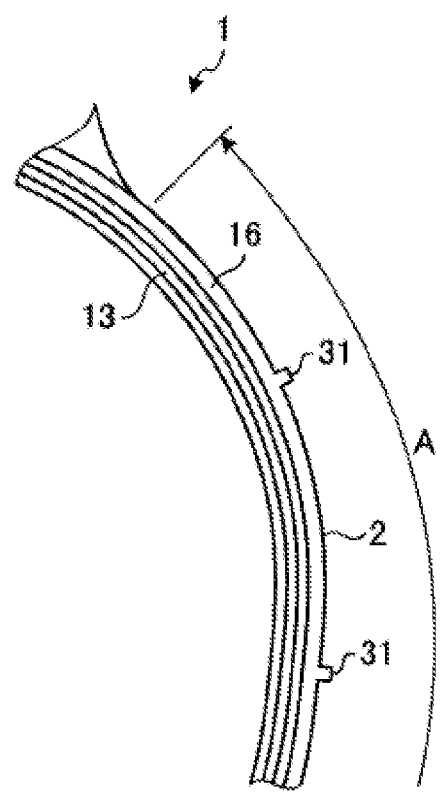
FIG. 9 is an explanatory view illustrating a modified example of the pneumatic tire depicted in FIG. 1.
Figure 10:
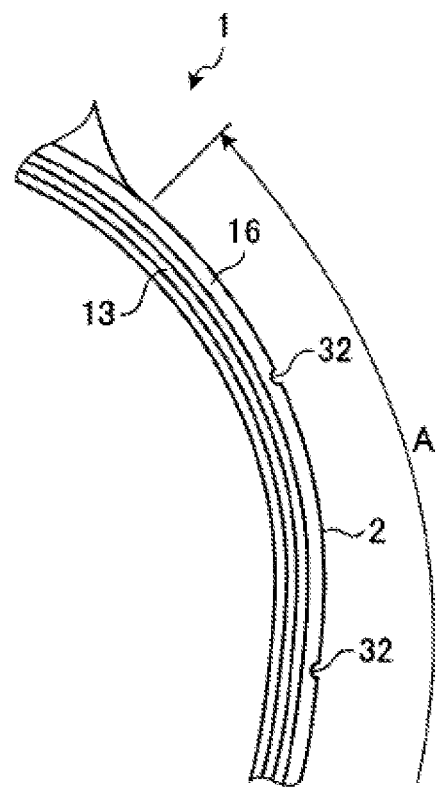
FIG. 10 is an explanatory view illustrating a modified example of the pneumatic tire depicted in FIG. 1.

However, the region A applied with the resin coating 2 is not limited thereto, and convex and concave portions 31, 32 may be disposed on the region A applied with the resin coating 2 (see FIGS. 9 to 10). These convex and concave portions 31, 32 can be constituted by, for example, a protrusion of a rib shape, a fine groove, a dimple, a ridge, or the like.

For example, with a configuration of FIG. 9, the sidewall rubber 16 has a plurality of convex portions 31 in the region A applied with the resin coating 2. Additionally, with a configuration of FIG. 10, the sidewall rubber 16 has a plurality of concave portions 32 in the region A applied with the resin coating 2. With the configurations of FIGS. 9 and 10, the tensile stress acting on the resin coating 2 is mitigated by these convex and concave portions 31, 32.

Figure 11:
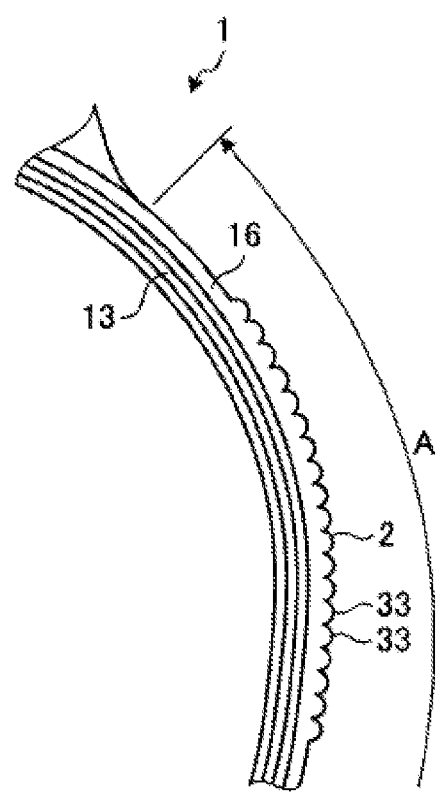
FIG. 11 is an explanatory view illustrating a modified example of the pneumatic tire depicted in FIG. 1.

Additionally, with a configuration of FIG. 11, the sidewall rubber 16 has a wall surface of an uneven shape applied with the resin coating 2. Specifically, a plurality of convex portions 33 is arranged continuously on a top surface of the sidewall rubber 16, and the resin coating 2 is also applied to each of these convex portions 33. By this, the cutting resistance of the sidewall portion is improved, and the appearance quality is improved by a luster of the resin coating 2.

Note that in the configuration of FIG. 11, the resin coating 2 may be applied only on the convex portions 33. In this situation, a disposition region of the convex portions 33 becomes the region A applied with the resin coating 2. By this, an amount of the resin coating 2 can be reduced to lighten the tire while ensuring an improvement effect of the cutting resistance by the resin coating 2.

Additionally, with the configuration of FIG. 11, concave portions may be disposed instead of the convex portions 33, or both the convex portions and the concave portions may be disposed (not illustrated). Additionally, the convex portions 33 may be disposed discontinuously (not illustrated).

Additionally, with the configurations of FIGS. 9 to 11, a width of one of the convex and concave portions 31 to 33 is preferably in a range of 0.5 mm or more and 2.0 mm or less, and heights of the convex and concave portions 31 to 33 are preferably in a range of 0.2 mm or more and 1.0 mm or less. By these lower limits, the tensile stress acting on the resin coating 2 is properly mitigated. Additionally, by these upper limits, a usage amount of the sidewall rubber 16 by the convex portions can be reduced and cracks that have as starting points the concave portions can be suppressed from occurring.

Configuration Having Annular Structure

Figure 12:
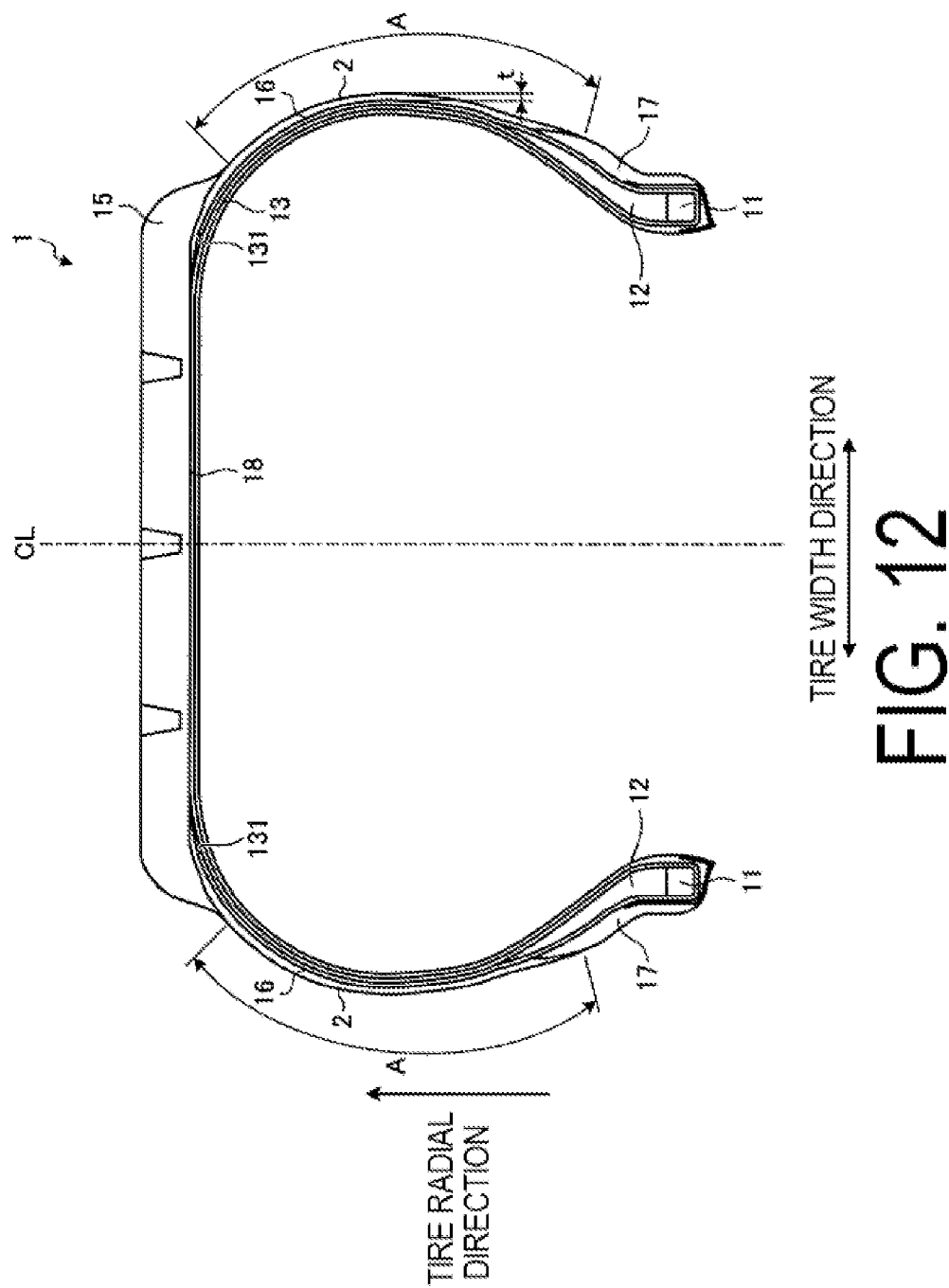
FIG. 12 is an explanatory view illustrating a modified example of the pneumatic tire depicted in FIG. 1.
Figures 13, 14:
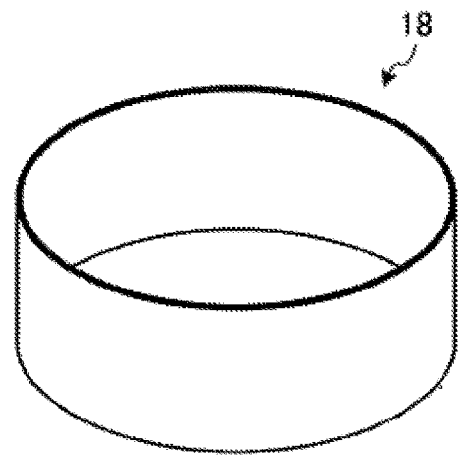
FIG. 13 is an explanatory view illustrating a modified example of the pneumatic tire depicted in FIG. 1.
FIG. 14 is a table showing results of performance testing of pneumatic tires according to embodiments of the present technology.

FIGS. 12 and 13 are explanatory views illustrating modified examples of the pneumatic tire 1 depicted in FIG. 1. In these drawings, components that are the same as those of the pneumatic tire 1 described in FIGS. 1 and 2 will be assigned the same reference numerals, and description thereof will be omitted.

The pneumatic tire 1 of FIG. 12 is provided with an annular structure 18 (see FIG. 13) instead of the belt layer 14 in the configuration of FIG. 2. Specifically, the pneumatic tire 1 is provided with the carcass layer 13, the annular structure 18 disposed on the outer side in the tire radial direction of the carcass layer 13, and the tread rubber 15 disposed on an outer side in the tire radial direction of this annular structure 18. Additionally, the annular structure 18 is embedded in the tread rubber 15 so as to not be exposed on an outer side in a radial direction of the tread rubber 15. Additionally, a peripheral surface of the annular structure 18 and a tire ground plane (a peripheral surface of the tread rubber 15) are disposed substantially parallel to each other.

The annular structure 18 is made of metal and has a tensile strength of 450 $N/m^2$ or more and 2,500 $N/m^2$ or less, preferably 600 $N/m^2$ or more and 2,400 $N/m^2$ or less, and more preferably 800 $N/m^2$ or more and 2,300 $N/m^2$ or less. By this, a strength, a rigidity, and a toughness of the annular structure 18 are properly ensured. As such a metal material, spring steel, high tensile steel, stainless steel, or titanium (including a titanium alloy), for example, can be adopted. Among these, stainless steel in particular is preferable because it has a high corrosion resistance and a tensile strength of the range described above.

When manufacturing the annular structure 18 with stainless steel, it is preferable to use martensitic stainless steel, ferritic stainless steel, austenitic stainless steel, austenite and ferrite duplex stainless steel, and precipitation hardening stainless steel, which are in a classification of JIS-G4303. By using these stainless steels, the tensile strength and the toughness of the annular structure 18 can be improved. Additionally, among the stainless steels described above, it is more preferable to use the precipitation hardening stainless steel (SUS631, SUS632J1) in particular.

Additionally, a product of the tensile strength (MPa) and a thickness (mm) of the annular structure 18 is called a pressure resistance parameter. This pressure resistance parameter becomes a scale of tolerance with respect to an internal pressure of the pneumatic tire 1. The pressure resistance parameter is preferably 200 or more and 1,700 or less or 250 or more and 1,600 or less. In particular, with the passenger car tire, the pressure resistance parameter is preferably 200 or more and 1,000 or less, and more preferably 250 or more and 950 or less. Additionally, with a small truck tire, the pressure resistance parameter is preferably 300 or more and 1,200 or less, and more preferably 350 or more and 1,100 or less. Additionally, with a truck/bus tire, the pressure resistance parameter is preferably 500 or more and 1,700 or less, and more preferably 600 or more and 1,600 or less.

Additionally, an elastic modulus of the annular structure 18 is preferably in a range of 70 GPa or more and 250 GPa or less, and more preferably in a range of 80 GPa or more and 230 GPa or less. Additionally, the thickness of the annular structure 18 is preferably in a range of 0.1 mm or more and 0.8 mm or less. By this, a pressure resistance performance and a durability of the annular structure 18 with respect to repeated bending can be ensured. Here, a product of the modulus of elasticity and the thickness of the annular structure 18 is called a rigidity parameter. At this time, the rigidity parameter is preferably in a range of 10 or more and 500 or less, and more preferably in a range of 15 or more and 400 or less.

Note that the annular structure 18 may be constituted from an integrally molded single member (see FIG. 13) or may be constituted by piecing together a plurality of members (not illustrated).

With the pneumatic tire 1 of FIG. 12, the belt layer 14 in the configuration of FIG. 2 can be omitted by disposing the annular structure 18 (see FIG. 13). By this, the rolling resistance of the tire can be reduced and a cornering power can be ensured.

Effect

As described above, this pneumatic tire 1 is provided with the carcass layer 13 and the sidewall rubber 16 disposed on the outer side in the tire width direction of the carcass layer 13 (see FIG. 2). Additionally, the pneumatic tire 1 is provided with the resin coating 2 applied on the predetermined region A of the sidewall portion. Additionally, the wall thickness t of the rubber of the sidewall portion in the region A applied with the resin coating 2 is in the range of 0.05 mm≤t≤4.0 mm.

With such a configuration, because the wall thickness t of the rubber of the sidewall portion in the region A applied with the resin coating 2 is made appropriate, there are advantages that the rolling resistance of the tire can be reduced and the cutting resistance of the tire is improved. Specifically, because t is not more than 4.0 mm, the rubber amount of the sidewall portion is reduced and the rolling resistance of the tire is reduced. Additionally, because t is not less than 0.05 mm, a strength of the sidewall portion is properly ensured. Meanwhile, there is an advantage that the cutting resistance of the sidewall portion is properly ensured by the resin coating 2 being applied on the sidewall portion. That is, the cutting resistance of the sidewall portion decreases when the wall thickness t of the rubber of the sidewall portion is made thin, but the cutting resistance of the sidewall portion is properly ensured by the resin coating 2 being applied on the sidewall portion.

Additionally, with this pneumatic tire 1, the thickness of the resin coating is in the range of 20 µm or more and 300 µm or less. By this, there is an advantage that the thickness of the resin coating 2 is made appropriate. That is, by the thickness of the resin coating 2 being 20 µm or more, an effect of maintaining the cutting resistance of the sidewall portion by the resin coating 20 is properly obtained. Additionally, by the thickness of the resin coating 2 being 300 µm or less, the sidewall portion is made thin and the rolling resistance of the tire is reduced.

Additionally, with this pneumatic tire 1, the breaking elongation of the sidewall rubber 16 is in the range of 200% or more and 500% or less. By this, there is an advantage that the breaking elongation of the sidewall rubber 16 is made appropriate. That is, by the breaking elongation of the sidewall rubber 16 being 200% or more, a durability of the sidewall rubber 16 with respect to bending deformation is ensured. Additionally, by the breaking elongation of the sidewall rubber 16 being 500% or less, a rigidity of the sidewall portion is properly ensured.

Additionally, with this pneumatic tire 1, the additive amount of the antioxidant to the sidewall rubber 16 is in the range of 0.1 parts by weight or more and 2.0 parts by weight or less. By this, there is an advantage that the additive amount of the antioxidant is made appropriate. That is, by the additive amount of the antioxidant being 0.1 parts by weight or more, an adhesion between the sidewall rubber 16 and the carcass layer 13 is properly ensured. Additionally, by the additive amount of the antioxidant being 2.0 parts by weight or less, an adhesion between the resin coating 2 and the sidewall rubber 16 is ensured.

Additionally, this pneumatic tire 1 is provided with the tire notation (not illustrated) attached by printing on the region A applied with the resin coating 2. With such a configuration, by the tire notation being attached by printing, an air resistance of the sidewall portion can be reduced. By this, there is an advantage that the rolling resistance of the tire can be reduced.

Additionally, with this pneumatic tire 1, the dynamic friction coefficient of the region A applied with the resin coating 2 is 0.5 or less. By this, there are advantages that the dynamic friction coefficient of the region A is reduced, the cutting resistance of the tire is improved, and an antifouling function of the tire is improved.

Additionally, this pneumatic tire 1 is provided with the convex and concave portions 31 to 33 on the region A applied with the resin coating 2 (see FIGS. 9 to 11). With such a configuration, because the convex and concave portions 31 to 33 mitigate the tensile stress acting on the resin coating 2, there is an advantage that a crack in the resin coating 2 is suppressed from occurring.

Additionally, with this pneumatic tire 1, the resin coating 2 is applied on the plurality of regions A divided (separated) in the tire circumferential direction or the tire radial direction (see FIGS. 4 to 8). With such a configuration, compared to a configuration where the resin coating 2 is applied on the region A of a wide width and an annular shape that is continuous in the tire circumferential direction and the tire radial direction (see FIG. 1), the tensile stress acting on the resin coating 2 is mitigated. By this, there is the advantage that the crack in the resin coating 2 is suppressed from occurring.

Additionally, with this pneumatic tire 1, the resin coating 2 is formed from the stacked plurality of coating layers (not illustrated). With such a configuration, by making appropriate a property of each of the coating layers, there is an advantage that the function of the resin coating 2 is improved.

Additionally, with this pneumatic tire 1, the coating layer of the outermost layer and the coating layer on the lower layer of the outermost layer that constitute the resin coating 2 have the mutually differing colors (not illustrated). With such a configuration, when the coating layer of the outermost layer is rubbed off, the coating layer of the different color on the lower layer thereof appears. By this, there is an advantage of being able to constitute an indicator of a repair time (re-coating time) of the resin coating 2. Additionally, there is also an advantage that recognition becomes easy when external damage is received.

Additionally, with this pneumatic tire 1, the carcass layer 13 has the end 131 folded to the outer side in the tire width direction, and the end 131 of the carcass layer 13 is disposed in the position away from the region A applied with the resin coating 2 (see FIG. 2). With such a configuration, in the region A applied with the resin coating 2, the influence of the difference in levels due to the end 131 of the carcass layer 13 is reduced. By this, there are advantages that the function of the resin coating 2 is properly ensured and the cutting resistance and a durability of the tire are ensured.

Additionally, with this pneumatic tire 1, the thickness of the resin coating 2 at the splice portion (in particular, the overlap portion of the end in the tire circumferential direction of the carcass ply) of the carcass layer 13 is thinner than the thickness of the resin coating 2 at the other portion of the region A (not illustrated). With such a configuration, by making the thickness of the resin coating 2 at the splice portion of the carcass layer 13 thinner than its surroundings, the rigidity difference between the splice portion of the carcass layer 13 and its surroundings can be eliminated (mitigated). By this, there is an advantage that the appearance quality of the tire is improved.

Additionally, this pneumatic tire 1 is provided with the cylindrical annular structure 18 disposed surrounding the periphery in the tire radial direction of the carcass layer 13 (see FIG. 12). With such a configuration, the belt layer 14 in the configuration of FIG. 2 can be omitted by the annular structure 18 being disposed. By this, there are advantages that the rolling resistance of the tire can be reduced and the corning power can be ensured.

Additionally, with this pneumatic tire 1, the carcass layer 13 is formed from the aramid fibers. By this, there is an advantage that the cutting resistance of the tire is improved.

Additionally, the method of manufacturing this pneumatic tire 1 is provided with the steps of vulcanization molding the green tire and applying the resin coating 2 on the tire using the residual heat after this vulcanization molding (not illustrated). By this, there is an advantage that the resin coating 2 can be dried quickly.

Additionally, the method of manufacturing this pneumatic tire 1 is provided with the steps of filling the green tire in the tire vulcanizing mold for vulcanization molding and applying the resin coating 2 on the tire in the tire vulcanizing mold by injecting the coating material in the tire vulcanizing mold (not illustrated). With such a configuration, by performing the pretreatment of the resin coating 2 in the tire vulcanization step, there is an advantage that the cycle time of manufacturing can be shortened.

Examples

FIG. 14 is a table showing results of performance testing of pneumatic tires according to embodiments of the present technology.

With this performance testing, evaluation relating to (1) rolling resistances and (2) cutting resistances of a plurality of mutually differing pneumatic tires is performed (see FIG. 14). With this performance testing, pneumatic tires of a tire size of 195/65R15 are mounted on an application rim prescribed by JATMA, and a maximum air pressure and a maximum load prescribed by JATMA are imparted to these pneumatic tires. Additionally, the pneumatic tires are mounted on a sedan of a displacement of 2,000 cc that is a test vehicle.

(1) With the evaluation relating to the rolling resistances, resistance forces when a drum diameter is 1,707 mm, a load is 4.5 kN, and a speed is 80 km/h are measured. Evaluations were performed by indexing the measurement results with the Conventional Example as the standard score (100). It is preferable with this evaluation that an index value is as small as possible.

(2) With the evaluation relating to the cutting resistances, the test vehicle mounted with the pneumatic tires is ridden over a curb of a height of 110 mm at a running speed of 20 km/h and an approach angle of 30 degrees. Additionally, cracks (a length and depth of cracks) occurring on the sidewall portions are observed for twenty pieces of tire samples. An indexed evaluation based on the observation results was performed with the index value of the Conventional Example being set as the standard score (100). It is preferable that this numerical value is as large as possible.

The pneumatic tires 1 of working examples 1, 2 have the configurations described in FIGS. 1 and 2 and are provided with the carcass layer 13 formed from the rayon fibers and the resin coating 2 formed from urethane.

A pneumatic tire 1 of a conventional example does not have the resin coating 2 in the configurations described in FIGS. 1 and 2.

As shown in a test result, with the working examples 1, 2, it is understood that the rolling resistances of the tires decrease and the cutting resistances of the tires are improved compared to the conventional example.

What is claimed is:

1. A pneumatic tire comprising a carcass layer, and a sidewall rubber disposed on an outer side in a tire width direction of the carcass layer, the pneumatic tire comprising a resin coating applied on a predetermined region A of a sidewall portion, a minimum value of a wall thickness t of the sidewall rubber in the region A applied with the resin coating being in a range of 0.05 mm≤t≤4.0 mm;
wherein the resin coating is formed from a stacked plurality of coating layers, and the coating layers includes a lowermost layer formed from a coating composition having an adhesion with respect to the sidewall rubber, an intermediate layer formed from a urethane resin coating composition having a strength, and a top surface layer formed from a silicon resin coating composition having a luster.

2. The pneumatic tire according to claim 1, wherein a breaking elongation of the sidewall rubber is in a range of 200% or more and 380% or less.

3. The pneumatic tire according to claim 1, wherein an additive amount of an antioxidant to the sidewall rubber is in a range of 0.1 parts by weight or more and 2.0 parts by weight or less.

4. The pneumatic tire according to claim 1, comprising a tire notation attached by printing on a surface of one or more region of the region A coated with the resin coating.

5. The pneumatic tire according to claim 1, wherein a dynamic friction coefficient of a surface of the region A coated with the resin coating is 0.5 or less.

6. The pneumatic tire according to claim 1, comprising a convex and concave portion on the region A applied with the resin coating.

7. The pneumatic tire according claim 1, wherein a coating layer of an outermost layer that constitutes the resin coating and a coating layer on a lower layer of the outermost layer have mutually differing colors.

8. The pneumatic tire according to claim 1, wherein the carcass layer has an end folded to the outer side in the tire width direction, and the end of the carcass layer is disposed in a position away from the region A applied with the resin coating, wherein the end of the carcass layer is defined as an edge of a carcass ply wound up in the tire radial direction.

9. The pneumatic tire according to claim 1, wherein the thickness of the resin coating at a splice portion of the carcass layer is thinner than the thickness of the resin coating at another portion of the region A.

10. The pneumatic tire according to claim 1, comprising a cylindrical annular structure made of metal and disposed surrounding a periphery in the tire radial direction of the carcass layer.

11. The pneumatic tire according to claim 1, wherein the carcass layer is formed from aramid fibers.

12. The pneumatic tire according to claim 1, wherein a thickness of the resin coating is in a range of 110 μm or more and 300 μm or less.

13. The pneumatic tire according to claim 1, wherein the region A comprises a plurality of regions A including three rows of regions disposed at the predetermined intervals in the tire radial direction.

14. The pneumatic tire according to claim 1, wherein the wall thickness t of the sidewall rubber in an entirety of the region A applied with the resin coating is in a range of 0.05 mm≤t≤4.0 mm.

15. A pneumatic tire comprising a carcass layer, and a sidewall rubber disposed on an outer side in a tire width direction of the carcass layer, the pneumatic tire comprising
a resin coating applied on a predetermined region A of a sidewall portion, a minimum value of a wall thickness t of the sidewall rubber in the region A applied with the resin coating being in a range of 0.05 mm≤t≤4.0 mm, wherein
the resin coating is formed from a stacked plurality of coating layers, individual layers of the stacked plurality coating layers being formed of different materials, and a dynamic friction coefficient of a surface of the region A coated with the resin coating is 0.5 or less; and
a thickness of the resin coating is in a range of 20 μm or more and 300 μm or less.

* * * * *